Patented Sept. 22, 1931

1,824,507

UNITED STATES PATENT OFFICE

THEO SCHWARZ, OF GOMEZ PALACIO, MEXICO, ASSIGNOR TO WURSTER & SANGER, INC., OF CHICAGO, ILLINOIS, A CORPORATION OF ILLINOIS

PROCESS FOR TREATING GLYCERINE LIQUORS

No Drawing.      Application filed May 21, 1928. Serial No. 279,601.

My invention relates to a process for treating raw glycerine liquors, and a primary object thereof is to facilitate the concentration of raw glycerine liquors obtained by splitting fats.

The glycerine liquor which forms the starting product of the present invention may be prepared in various manners by the saponification or splitting of fats. It may be prepared by the Twitchell process, by the lime saponification process or by the autoclave saponification process.

In the Twitchell process the fat or oil to be saponified is first purified by boiling with a small amount of sulphuric acid added. After the acid treatment is complete the impurities in the acid liquor are removed. The melted and purified fat or oil is then boiled with a small content of sulphonated aromatic fatty acid and with some sulphuric acid and water. The glycerine liquor or sweet water may then be drawn off.

In the lime saponification process the fats or oils are boiled with hydrated lime or calcium hydroxide to form the calcium soaps of the fatty acids and a glycerine liquor.

In the autoclave saponification process the fat or oil is treated with superheated steam under pressure with or without a catalytic agent such as calcium oxide or magnesium oxide until the glycerine has been liberated. The glycerine liquor can then be removed from the insoluble fatty acids.

In the refining of the glycerine liquor thus produced it is preferable to maintain the liquor at a concentration of about 10 to 12% of glycerine, but this concentration may vary from a minimum of 5% to a maximum of about 15%. In practice the glycerine concentration is maintained substantially constant throughout the steps of the present process following preparation of the crude liquor.

In the refining operation of the present invention the glycerine liquor may or may not be treated with an acid such as sulphuric. In one embodiment of the invention the glycerine liquor may first be treated with a small amount of an acid such as sulphuric, to facilitate the separation of traces of fatty acids therein. This is especially true of glycerine which is produced by the autoclave saponification process in which case 0.1% to 0.2% of sulphuric acid is added to the sweet water. This addition of sulphuric acid is not necessary in the case of glycerine liquors from the Twitchell process in view of the fact that such liquor already contains a certain small amount of sulphuric acid as a result of the saponification process. It may also be desirable to treat the glycerine liquors resulting from the lime saponification processes with a sufficient amount of sulphuric acid to neutralize the alkalinity and to slightly acidify the liquor. In all cases, after or during the sulphuric acid treatment or other acidification treatment the solution may be agitated, allowed to stand, and then filtered so as to remove any fatty acid or other material which might have been separated by the acidification process.

The dilute glycerine liquors may next be treated with a hydrated oxide of an alkali earth metal. Sufficient alkali earth metal hydroxide may be added to the glycerine liquor to cause such liquor to react pink with phenolphthalein. This treatment may be preferably carried out with hydrated lime or calcium hydroxide but it also may be carried out with hydrated barium oxide or barium hydroxide. In certain cases this alkali treatment may also be omitted.

This treatment with an alkali earth metal oxide is especially advantageous when applied to the crude glycerine liquor prepared by the Twitchell process. In this case from about one-third pound to one and one-half pounds of hydrated lime are added to one hundred pounds of the glycerine liquor. The glycerine liquor is thoroughly agitated with the lime and the resulting precipitate separated. The lime treatment may be supplemented and precipitation thus aided by treatment with aluminum sulphate, sodium aluminate, iron sulphate or ferric chloride. These materials are all capable of producing a precipitate of a coagulating hydroxide in the dilute glycerine liquor. The amount of such additional chemical is preferably less than 1%. For example in the case of aluminum sulphate, the amount of salt added may be about 0.5%.

A glycerine liquor subjected to the previously described acidification and alkalinization treatments by sulphuric acid and hydrated lime respectively, may next be subjected to a treatment with a zeolitic material. This treatment is preferably carried out by filtering the dilute glycerine liquor through the zeolitic material but if desired the zeolitic material may be agitated with the glycerine liquor and after it has settled the glycerine liquor may be decanted. Glycerine liquor treated with a zeolite should preferably contain about 12 to 15% glycerine. The zeolite treatment may be preceded if desired by a treatment with sodium carbonate or soda ash. In such case preferably about ½ lb. to 5 lbs. of 58% soda ash is added to 1,000 lbs. of the glycerine liquor. In case the soda ash treatment is carried out prior to treatment with the zeolites, care must be taken to separate all of the precipitate so that there will be no possibility of a coating of the zeolitic material, which would prevent efficient surface contact of the glycerine liquor. During or after the sodium carbonate treatment aluminum sulphate or other coagulent may be added to aid precipitation. In the preferred embodiment of the invention some of the previously precipitated sludge or previously formed precipitate may be added to insure complete sedimentation before or during the precipitation to the vessel or vessels in which the precipitation reaction is being carried out. The glycerine liquid may also be filtered through a sand filter before treatment with the zeolites.

The zeolites serve to change the calcium and similar salts in the glycerine liquor to more readily soluble and less easily precipitated salts such as of sodium. In the subsequent treatment of the glycerine liquor, for example, in distillation, the change in form of the inorganic salts effects considerable economies in the operation of the refining process.

What is claimed is:

1. A process of refining glycerine which comprises providing a glycerine liquor of 5 to 15% concentration, treating such glycerine liquor with hydrated lime, separating the precipitate resulting from the liquor, treating the liquor with a zeolite and finally concentrating.

2. A process of refining glycerine which comprises providing a dilute glycerine liquor of 5 to 15% concentration, acidulating such glycerine liquor, treating such acidulated glycerine liquor with hydrated lime, agitating and filtering, then adding sodium carbonate to the liquor, agitating, filtering, then contacting the resultant liquor with a zeolite and finally concentrating.

3. A process of refining glycerine which comprises providing a dilute glycerine liquor containing 5 to 15% of glycerine, treating such glycerine liquor with a hydrated alkali earth metal hydroxide, agitating and filtering, treating with sodium carbonate, removing the precipitate, then passing the liquor through a bed of zeolites and finally concentrating the glycerine therein.

4. A process of refining glycerine which comprises providing a dilute glycerine liquor of 5 to 15% concentration, treating the liquor with a zeolite and finally concentrating.

5. A process of refining glycerine which comprises providing a glycerine liquor containing 5 to 15% of glycerine, treating the liquor with a zeolite and finally concentrating it.

In testimony whereof I have hereunto subscribed my name.

THEO SCHWARZ.